United States Patent
Ward

(10) Patent No.: US 11,184,534 B2
(45) Date of Patent: Nov. 23, 2021

(54) POSTURE APPLICATION FOR MOBILE DEVICES

(71) Applicant: SUSASYM LLC, Dallas, TX (US)

(72) Inventor: Darin Ward, Dallas, TX (US)

(73) Assignee: SUSASYM LLC, Dallas, TX (US)

( * ) Notice: Subject to any disclaimer, the term of this patent is extended or adjusted under 35 U.S.C. 154(b) by 75 days.

(21) Appl. No.: 16/813,157

(22) Filed: Mar. 9, 2020

(65) Prior Publication Data
US 2021/0281767 A1 Sep. 9, 2021

(51) Int. Cl.
H04N 5/232 (2006.01)

(52) U.S. Cl.
CPC ... *H04N 5/232411* (2018.08); *H04N 5/23219* (2013.01); *H04N 5/23222* (2013.01); *H04N 5/23258* (2013.01)

(58) Field of Classification Search
None
See application file for complete search history.

(56) References Cited

U.S. PATENT DOCUMENTS

| 9,962,093 B2 * | 5/2018 | Dolph | G01K 13/20 |
| 2015/0055008 A1 * | 2/2015 | Rabii | H04N 5/232411 |
| | | | 348/333.13 |
| 2019/0228773 A1 * | 7/2019 | Gao | G06F 3/013 |

* cited by examiner

*Primary Examiner* — Quan Pham
(74) *Attorney, Agent, or Firm* — Braxton Perrone, PLLC; Gregory Perrone; Bobby W. Braxton

(57) ABSTRACT

A mobile device includes a display, a gyroscope, a camera, a memory, and a hardware processor. The gyroscope can determine an angle between a plane defined by the display and a plane that is substantially perpendicular to the direction of gravity. The camera can capture an image of a user. The memory stores a set angle and a threshold. The processor determines a difference between the set angle and the angle. The processor further receives the image from the camera. The processor determines a location of the user's lips in the image. In response to determining that the difference remains greater than the threshold for a first time interval or that the user's lips remain open for a second time interval, the processor turns off the display. In response to turning off the display, the processor determines that a third time interval has passed and turns on the display.

20 Claims, 7 Drawing Sheets

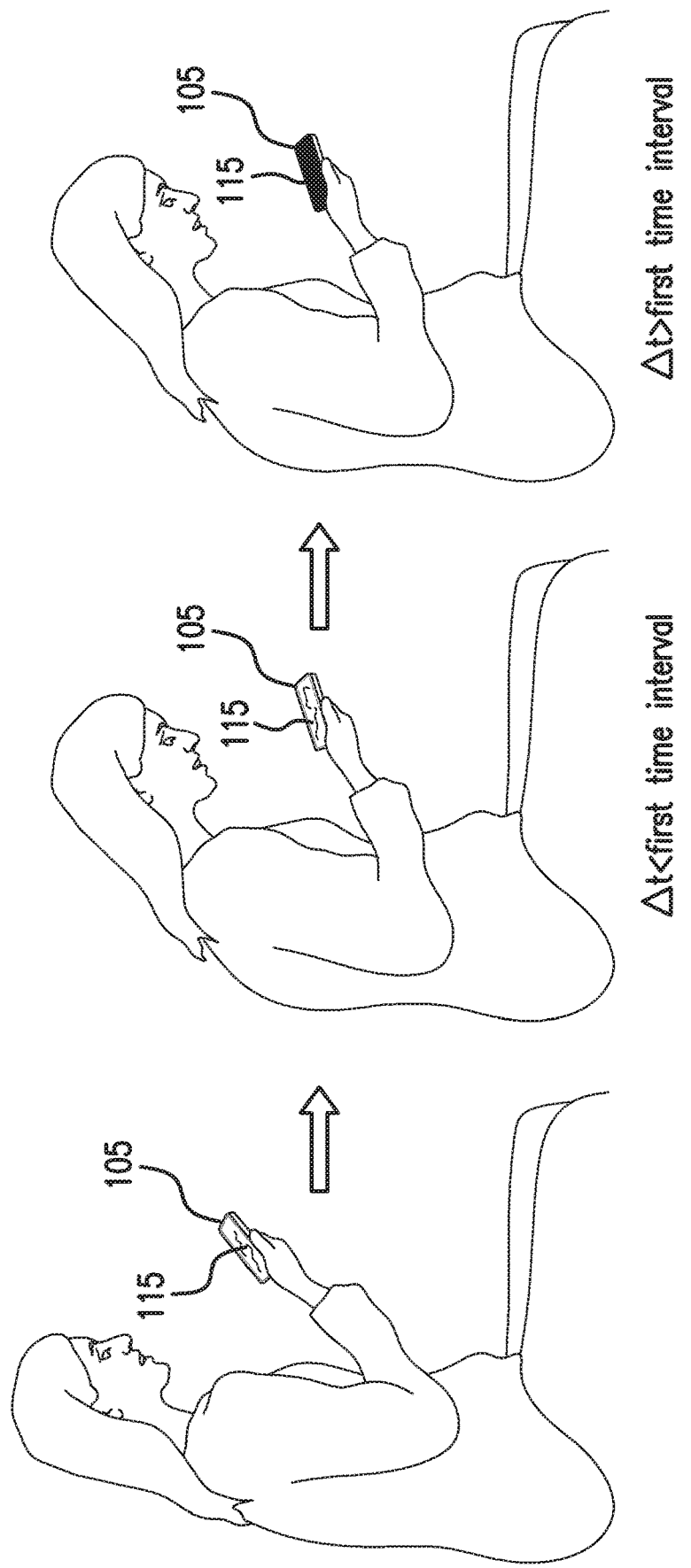

Δt<second time interval

Δt>second time interval

POSTURE APPLICATION FOR MOBILE DEVICES

TECHNICAL FIELD

This disclosure relates generally to mobile devices.

BACKGROUND

American adults spent an average of three and a half hours per day on mobile devices in 2018 and future use is only expected to rise. Young children are also increasingly using mobile devices; nearly half of all children eight years old and younger have their own mobile tablets and over half of children between the ages of eight and twelve have mobile phones.

SUMMARY OF THE DISCLOSURE

American adults spent an average of three and a half hours per day on mobile devices in 2018 and future use is only expected to rise. Young children are also increasingly using mobile devices; nearly half of all children eight years old and younger have their own mobile tablets and over half of children between the ages of eight and twelve have mobile phones. The increased use of mobile devices can lead to health problems, resulting from poor posture maintained over prolonged periods of time during device use. These problems can include back pain and spinal mal-alignment, headaches, increased risk of shoulder injury in addition to a limited range of motion resulting from shortened pectoralis minor muscles from the shoulder that become "rolled forward," numbness of the arms, hands, and/or fingers resulting from pressure on the brachial plexus of nerves, and loss of the lordotic curve of the cervical spine leading to neck/back pain. These problems can be especially serious for children, whose bodies are still developing. However, given the prevalence and importance of mobile devices in modern society, it is unrealistic to attempt to limit individuals' access to such devices in order to help them maintain proper posture.

Furthermore, in many cases, removing or limiting an individual's access to a mobile device may not act to improve the individual's posture. As an example, individuals who tend to breathe out of their mouths rather than their noses often develop forward head posture (regardless of whether they operate mobile devices), as they bend their heads forward and extend their necks to increase their airways—a compensation mechanism for the reduced air flow they receive from mouth breathing. Forward head posture can lead to a variety of health problems, including reduced neck mobility, neck pain, migraines, and tension headaches. As with other types of poor posture, the risk of developing forward head posture and its associated problems are especially strong for children, whose bodies are still developing.

This disclosure contemplates an unconventional mobile device that addresses one or more of the above issues. The mobile device employs both a gyroscope and a camera to determine whether a user is maintaining proper posture and/or breathing through his/her nose while using the device. The mobile device uses the gyroscope to determine the orientation of the device—specifically, the angle between the screen of the mobile device and a plane perpendicular to the direction of gravity. Typically, this angle will be smaller for a user with poor posture than for a user with proper posture. The mobile device then determines the difference between a set angle that is chosen to indicate the approximate orientation of the mobile device when it is operated by a user exhibiting proper posture and the measured angle. If this difference remains greater than a set threshold for a specified time interval, the mobile device turns off the display. Additionally, the mobile device uses the camera to capture an image of the user. The mobile device then analyzes the image to determine whether the user's lips are open. If the mobile device determines that the user's lips are open and remain open for a specified time interval, the mobile device again turns off the display. Once the mobile device has turned off the display, the mobile device waits a set period of time before automatically turning the display back on. In this manner, the mobile device helps the user maintain proper posture. Certain embodiments of the posture tool are described below.

According to one embodiment, a mobile device includes a display, a gyroscope, a camera, a memory, and a hardware processor communicatively coupled to the memory. The gyroscope is able to determine an angle between a plane defined by the display and a plane that is substantially perpendicular to the direction of gravity. The camera is positioned on a surface of the mobile device. The surface includes the display. The camera is able to capture an image of a user. The memory stores a set angle and a threshold. The hardware processor receives the angle from the gyroscope. The processor next determines a difference between the set angle and the angle received from the gyroscope. The processor further determines that the difference remains greater than the threshold for a first time interval. The processor additionally receives the image from the camera. The processor then determines a location of the user's lips in the image. The processor next determines, based on the location of the user's lips, that the user's lips are open. The processor further determines that the user's lips remain open for a second time interval. In response to determining that the difference remains greater than the threshold for the first time interval or that the user's lips remain open for the second time interval, the processor turns off the display. In response to turning off the display, the processor determines that a third time interval has passed. In response to determining that the third time interval has passed, the processor turns on the display.

According to another embodiment, a method includes receiving an angle from a gyroscope. The gyroscope is able to determine the angle between a plane defined by a display of a mobile device and a plane that is substantially perpendicular to the direction of gravity. The method further includes determining a difference between a set angle and the angle received from the gyroscope. The method additionally includes receiving an image from a camera. The camera is positioned on a surface of the mobile device. The surface includes the display. The camera is able to capture an image of a user. The method further includes determining a location of the user's lips in the image. The method also includes determining, based on the location of the user's lips, that the user's lips are open. The method additionally includes determining either that the difference between the angle and the set angle remains greater than a threshold for a first time interval or that the user's lips remain open for a second time interval. In response to determining either that the difference remains greater than the threshold for the first time interval or that the user's lips remain open for a second time interval, the method includes turning off the display. In response to turning off the display, the method includes determining that a third time interval has passed. In response to determining that the third time interval has passed, the method includes turning on the display.

According to a further embodiment, a system includes a display, a gyroscope, a camera, a storage element, and a processing element communicatively coupled to the storage element. The gyroscope is able to determine an angle between a plane defined by the display and a plane that is substantially perpendicular to the direction of gravity. The camera is positioned on a surface of the mobile device. The surface includes the display. The camera is able to capture an image of a user. The memory stores a set angle and a threshold. The processing element receives the angle from the gyroscope. The processing element next determines a difference between the set angle and the angle received from the gyroscope. The processing element further determines that the difference remains greater than the threshold for a first time interval. The processing element additionally receives the image from the camera. The processing element then determines a location of the user's lips in the image. The processing element next determines, based on the location of the user's lips, that the user's lips are open. The processing element further determines that the user's lips remain open for a second time interval. In response to determining that the difference remains greater than the threshold for the first time interval or that the user's lips remain open for the second time interval, the processing element turns off the display. In response to turning off the display, the processing element determines that a third time interval has passed. In response to determining that the third time interval has passed, the processing element turns on the display. The processing element further communicates a message to the user indicating that the user was mouth breathing and/or not maintaining proper posture.

Certain embodiments provide one or more technical advantages. For example, an embodiment helps a user maintain proper posture. As another example, an embodiment helps prevent a user from developing forward head posture. As another example, an embodiment helps correct a user's mouth breathing habit. As a further example, an embodiment reduces the risk of developing serious health problems including neck and back pain, spinal mal-alignment, and reduced mobility. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
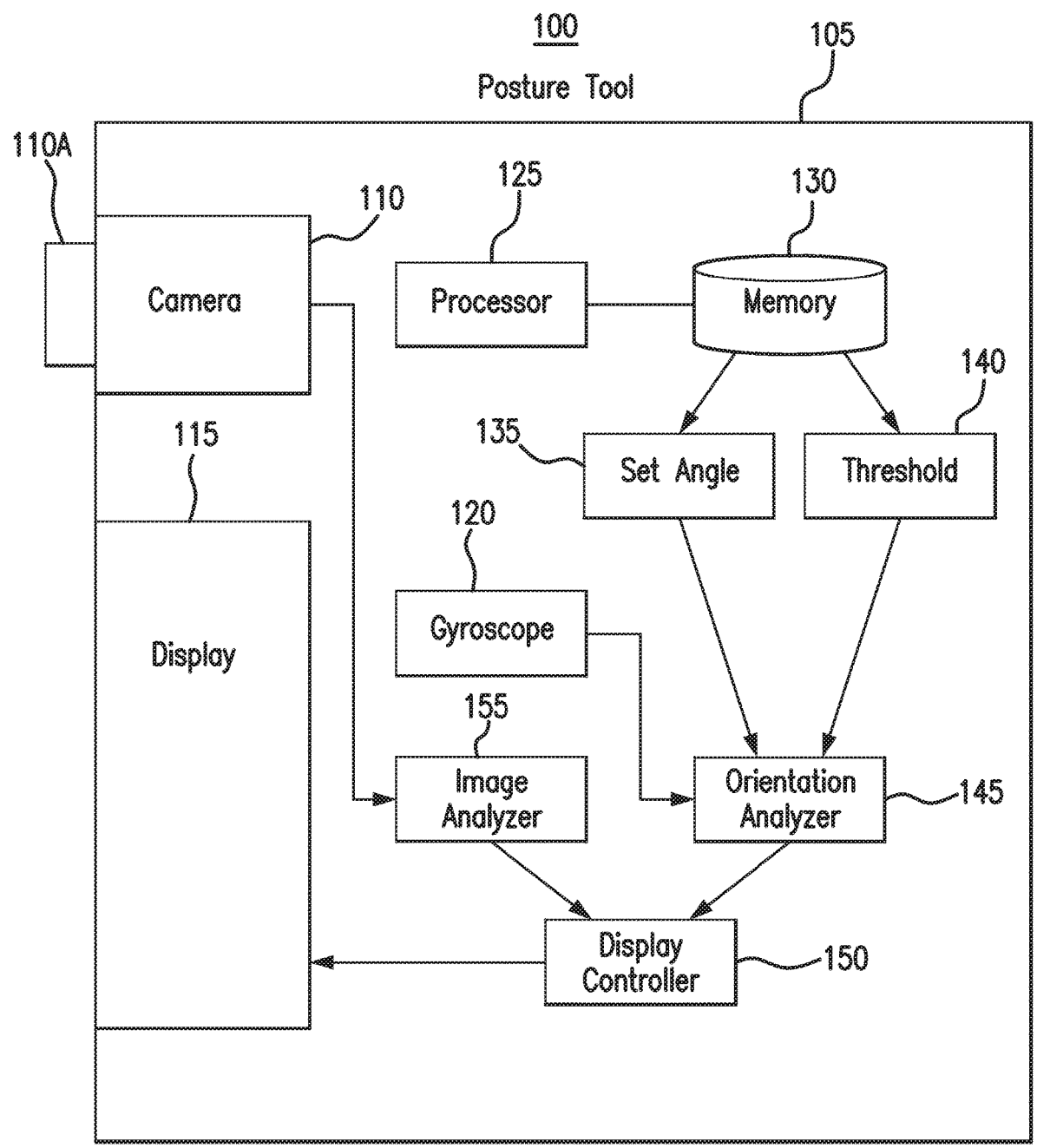
FIG. 1 illustrates an example posture tool system.

Embodiments of the present disclosure and its advantages are best understood by referring to FIGS. 1 through 6 of the drawings, like numerals being used for like and corresponding parts of the various drawings.

American adults spent an average of three and a half hours per day on mobile devices in 2018 and future use is only expected to rise. Young children are also increasingly using mobile devices; nearly half of all children eight years old and younger have their own mobile tablets and over half of children between the ages of eight and twelve have mobile phones. The increased use of mobile devices can lead to health problems, resulting from poor posture maintained over prolonged periods of time during device use. These problems can include back pain and spinal mal-alignment, headaches, increased risk of shoulder injury in addition to a limited range of motion resulting from shortened pectoralis minor muscles from the shoulder that become "rolled forward," numbness of the arms, hands, and/or fingers resulting from pressure on the brachial plexus of nerves, and loss of the lordotic curve of the cervical spine leading to neck/back pain. These problems can be especially serious for children, whose bodies are still developing. However, given the prevalence and importance of mobile devices in modern society, it is unrealistic to attempt to limit individuals' access to such devices in order to help them maintain proper posture.

Furthermore, in many cases, removing or limiting an individual's access to a mobile device may not act to improve the individual's posture. As an example, individuals who tend to breathe out of their mouths rather than their noses often develop forward head posture (regardless of whether they operate mobile devices), as they bend their heads forward and extend their necks to increase their airways—a compensation mechanism for the reduced air flow they receive from mouth breathing. Forward head posture can lead to a variety of health problems, including reduced neck mobility, neck pain, migraines, and tension headaches. As with other types of poor posture, the risk of developing forward head posture and its associated problems are especially strong for children, whose bodies are still developing.

This disclosure contemplates an unconventional mobile device that addresses one or more of the above issues. The mobile device employs both a gyroscope and a camera to determine whether a user is maintaining proper posture and/or breathing through his/her nose while using the device. The mobile device uses the gyroscope to determine the orientation of the device—specifically, the angle between the screen of the mobile device and a plane perpendicular to the direction of gravity. Typically, this angle will be smaller for a user with poor posture than for a user with proper posture. The mobile device then determines the difference between a set angle that is chosen to indicate the approximate orientation of the mobile device when it is operated by a user exhibiting proper posture and the measured angle. If this difference remains greater than a set threshold for a specified time interval, the mobile device turns off the display. Additionally, the mobile device uses the camera to capture an image of the user. The mobile device then analyzes the image to determine whether the user's lips are open. If the mobile device determines that the user's lips are open and remain open for a specified time interval, the mobile device again turns off the display. Once the mobile device has turned off the display, the mobile device waits a set period of time before automatically turning the display back on. In this manner, the mobile device helps the user maintain proper posture. The posture tool will be described in more detail using FIGS. 1 through 5.

FIG. 1 illustrates an example posture tool system 100. As seen in FIG. 1, posture tool system 100 includes mobile device 105. This disclosure contemplates that mobile device 105 includes any appropriate portable device for implementing posture tool system 100. For example, mobile device 105 can be a mobile phone, a tablet, a personal digital assistant, an e-reader, or any other appropriate portable electronic device.

Generally, mobile device 105 of posture tool system 100 determines that a user is operating mobile device 105 with poor posture and/or while breathing through his/her mouth and shuts off display 115, thereby encouraging the user to correct his/her behavior. Mobile device 105 can accomplish this in two ways. First, mobile device 105 uses gyroscope 120 to determine the orientation of mobile device 105—specifically, the angle between display 115 and a plane perpendicular to the direction of gravity. Mobile device then determines the difference between set angle 135 and the measured angle. If this difference remains greater than set threshold 140 for a specified first time interval, mobile device 105 turns off display 115. Additionally, mobile device 105 uses camera 110 to capture an image of the user. Mobile device 105 then analyzes the image to determine whether the user's lips are open. If mobile device 105 determines that the user's lips are open and remain open for a specified second time interval, mobile device 105 turns display 115 off. In this manner, mobile device 105 helps the user to maintain proper posture while operating mobile device 105.

As can be seen in FIG. 1, mobile device 105 of posture tool system 100 includes processor 125, memory 130, camera 110, camera lens 110A, display 115, and gyroscope 120. This disclosure contemplates processor 125 and memory 130 being configured to perform any of the functions of posture tool system 100 described herein. Generally, posture tool system 100 implements orientation analyzer 145, which determines whether the user is holding mobile device 105 at an orientation indicating poor posture for a first time interval, image analyzer 155, which determines whether the user's lips remain open for a second time interval, and display controller 150, which turns off display 115 if orientation analyzer 145 determines that the user is holding mobile device 105 at an orientation indicating poor posture for the first time interval, or image analyzer 155 determines that the user's lips remain open for the second time interval. Once display controller has turned off display 115, display controller next determines that a third time interval has passed and turns display 115 back on. Orientation analyzer 145 is discussed in further detail below, in the discussion of FIGS. 3A and 3B. Image analyzer 155 is discussed in further detail below, in the discussion of FIG. 4.

In certain embodiments, the third time interval over which display controller 150 waits before turning display 115 back on is a constant value, set by a user of mobile device 105. For example, a parent may set the value for the third time interval on a mobile device 105 used by his/her child, based on the parent's preferences. In further embodiments, the third time interval is variable. As an example, in certain embodiments display controller 150 can additionally update a counter each time display controller 150 turns display 115 off. Display controller 150 can then use the value of the counter to determine the frequency with which display controller 150 turns display 115 off, thereby indicating the frequency with which a user of mobile device 105 exhibits poor posture and/or mouth breathing while using mobile device 105. Display controller 150 can then modify the third time interval based on the frequency, increasing its value when the frequency with which display controller 150 turns off display 115 increases. This desirable, as individual behaviors will likely vary, and a high frequency value presumably indicates that the third time interval is not long enough for the action of turning off display 115 to act as a deterrent for the particular user. Additionally, display controller 150 can decrease the value of the third time interval when the frequency with which display controller 150 turns off display 115 decreases. This is desirable because a low frequency likely indicates that the user is, in general, maintaining proper posture and breathing through his/her nose while using mobile device 105, and therefore may only need an occasional, quick reminder when he/she has a lapse in either his/her maintenance of proper posture or his/her nasal breathing.

In certain embodiments, orientation analyzer 145, image analyzer 155, and display controller 150 can be deactivated by entering a password into mobile device 105. It is desirable for a parent of a child operating mobile device 105 to allow the parent to deactivate orientation analyzer 145, image analyzer 155, and display controller 150 whenever he/she desires, but to ensure that the child is unable to deactivate these components without knowledge of the password.

In certain embodiments, after determining that a user of mobile device 105 is exhibiting poor posture and/or mouth breathing while operating the device, mobile device 105 communicates a message to the user, indicating that the user was either not maintaining proper posture or was breathing through his/her mouth. For example, in certain embodiments, display controller 150 causes a message to be displayed on display 115 prior to turning display 115 off. In other embodiments, display controller 150 causes a message to be displayed on display 115 after turning display 115 back on. In further embodiments, mobile device 105 outputs an audio message to the user while display 115 is off. Communicating a message to the user can be desirable to ensure that the user is aware of the reason that display 115 shut off and doesn't think that there is something wrong with his/her mobile device 105.

Processor 125 is any electronic circuitry, including, but not limited to microprocessors, application specific integrated circuits (ASIC), application specific instruction set processor (ASIP), and/or state machines, that communicatively couples to memory 130 and controls the operation of mobile device 105. Processor 125 can be 8-bit, 16-bit, 32-bit, 64-bit or of any other suitable architecture. Processor 125 can include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 125 can include other hardware and software that operates to control and process information. Processor 125 executes software stored on memory to perform any of the functions described herein. Processor 125 controls the operation and administration of mobile device 105 by processing information received from camera 110, gyroscope 120, and memory 130. Processor 125 can be a programmable logic device, a microcontroller, a microprocessor, any suitable processing device, or any suitable combination of the preceding. Processor 125 is not limited to a single processing device and can encompass multiple processing devices.

Memory 130 can store, either permanently or temporarily, data, operational software, or other information for processor 125. Memory 130 can include any one or a combination of volatile or non-volatile local or remote devices suitable for storing information. For example, memory 130 can include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software can be embodied in memory 130, a disk, a CD, or a flash drive. In particular embodiments, the software can include an application executable by processor 125 to perform one or more of the functions described herein.

Memory 130 also stores set angle 135 and threshold 140. Set angle 135 and threshold 140 are both used by orientation analyzer 145 to determine whether a user is holding mobile device 105 at an orientation indicating poor posture for a first time interval. Specifically, orientation analyzer receives the orientation of mobile device 105—namely, the angle between display 115 and a plane that is substantially perpendicular to the direction of gravity—from gyroscope 120. This disclosure contemplates that a plane is substantially perpendicular to the direction of gravity if it is within five degrees of being perpendicular to the direction of gravity. Orientation analyzer then determines the difference between set angle 135 and the angle obtained from gyroscope 120. If this different is greater than threshold 140, orientation analyzer 145 assumes that the user of mobile device 105 is operating the device with poor posture.

In certain embodiments, set angle 135 is set at ninety degrees. This assumes that a user operating mobile device 105 with proper posture will hold mobile device 105 within threshold 140 of vertical. In further embodiments, set angle 135 is set based on the behavior of the particular user of mobile device 105. For example, in certain embodiments, in order to calibrate set angle 135, display 115 of mobile device 105 can communicate a prompt to the user requesting that the user operate mobile device 105 while maintaining proper posture. Mobile device 105 can then collect a series of measurements of the angle between the plane defined by the display and the plane that is substantially perpendicular to the direction of gravity, using gyroscope 120, and use these measurements to determine set angle 135. For example, mobile device 105 can determine set angle 135 based on the average of the series of measurements.

In certain embodiments, threshold 140 is also set based on the behavior of the particular user of mobile device 105. For example, in certain embodiments, in order to calibrate threshold 140, display 115 of mobile device 105 can communicate a prompt to the user requesting that the user operate mobile device 105 while maintaining proper posture. Mobile device 105 can then collect a series of measurements of the angle between the plane defined by the display and the plane that is substantially perpendicular to the direction of gravity, using gyroscope 120, and use these measurements to determine threshold 140. For example, mobile device 105 can determine threshold 140 based on the total range of angles included in the series of measurements.

As another example, mobile device 105 can determine threshold 140 based on the standard deviation of the series of measurements.

In certain embodiments, posture tool system 100 implements orientation analyzer 145, image analyzer 155, and display controller 150 by using processor 125 and memory 130 to execute an application. Software for the application can be stored in memory 130. Executing the application can cause processor 125 and/or software tool system 100 to perform the functions of orientation analyzer 145, image analyzer 155, and display controller 150. In certain embodiments, posture tool system 100 uses processor 125 and memory 130 to execute the application each time a user turns on mobile device 105.

Camera 110 is positioned on a surface of mobile device 105 that includes display 115. Camera 110 is used to capture an image of a user of mobile device 105. Camera 110 includes camera lens 110A. Camera lens 110A is a single lens or a plurality of lenses and is used to collect and focus light. Camera 110 captures images formed by the light collected and focused by camera lens 110A and processes these images into a digital data stream for receipt by image analyzer 155.

Display 115 is a screen used by mobile device 105 to communicate information and content to a user of mobile device 105. In certain embodiments, display 115 is a standard touch-screen liquid crystal display found in a typical smartphone/tablet. In certain other embodiments, display 115 is an electronic paper display that reflects rather than emits light, such as those found in conventional e-readers.

Gyroscope 120 is a sensor within mobile device 105 that is used to determine the orientation of mobile device 105. In certain embodiments, gyroscope 120 is a micro-electro-mechanical systems (MEMS) gyroscope. Gyroscope 120 is used to determine the angle between display 115 of mobile device 105 and a plane perpendicular to the direction of gravity, for receipt by orientation analyzer 145.

In certain embodiments, posture tool system 100 helps a user maintain proper posture while operating a mobile device 105. By using information about the orientation of mobile device 105, in certain embodiments, posture tool system 100 is able to determine whether a user is operating mobile device 105 with a slouched posture. Additionally, in certain embodiments, by analyzing images of a user's face, in certain embodiments, posture tool system 100 is able to determine whether the user is operating mobile device 105 while breathing through his/her mouth. By shutting off display 115 of mobile device 105 in response to determining that the user is operating mobile device 105 with a slouched posture and/or while breathing through his/her mouth, certain embodiments encourage the user to operate mobile device 105 while sitting upright and breathing through his/her nose.

Figure 2B:
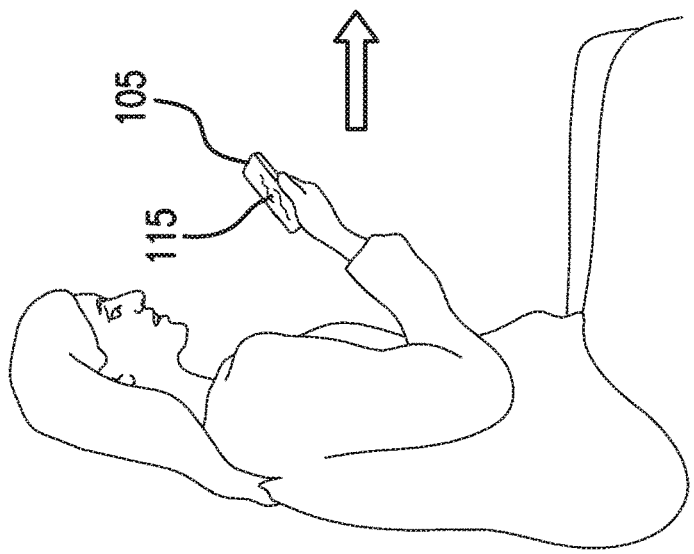
FIGS. 2A(a)-2A(c) and 2B(a)-2B(c) present example illustrations of a user operating the mobile device of the posture tool system in FIG. 1.
Figure 2B:
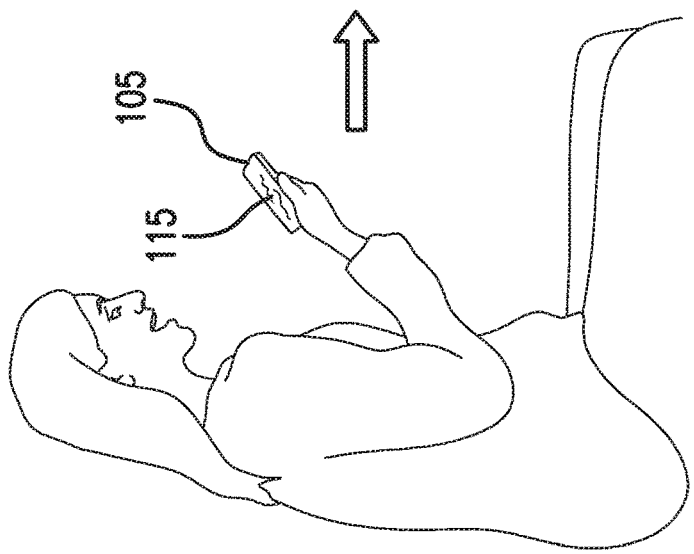
Figure 2B:
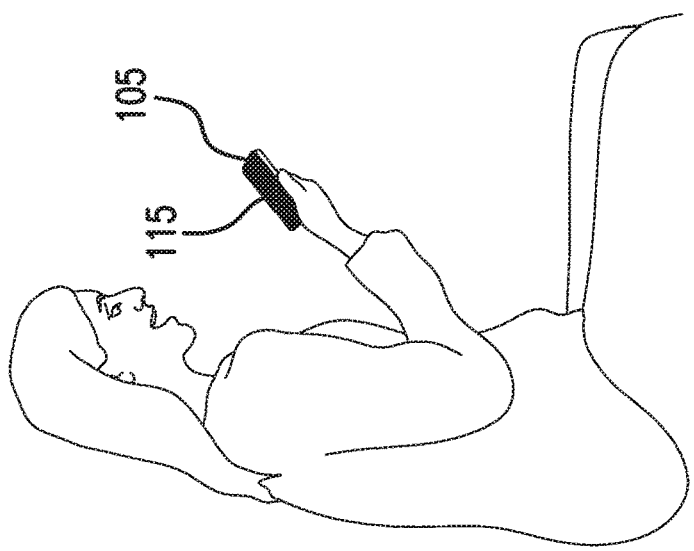

FIGS. 2A and 2B present example illustrations of a user operating mobile device 105 of posture tool system 100. FIG. 2A illustrates the behavior of posture tool system 100 when the user operates mobile device 105 while slouching, and FIG. 2B illustrates the behavior of posture tool system 100 when the user operates mobile device 105 while breathing through his/her mouth.

As can be seen, the user depicted in FIG. 2A(a) is operating mobile device 105 while maintaining proper posture. Display 115 therefore remains on. In FIG. 2A(b), the user has begun to slouch and is now holding mobile device 105 at an orientation that is closer to horizontal than the orientation depicted in FIG. 2A(a). FIG. 2A(b) assumes that the difference between set angle 135 and the angle associated with this orientation is greater than threshold 140, however display 115 remains on in FIG. 2A(b), because the first time interval has not yet passed. Using a non-zero first time interval may be desirable, to help avoid turning off display 115 based on brief changes in orientation that may be unrelated to changes in posture. Once the first time interval has passed and the user has not made any significant correction to her posture (and accordingly, no significant changes to the orientation of mobile device 105), mobile device 105 shuts off display 115, as illustrated in FIG. 2A(c).

FIG. 2B(a) again illustrates a user operating mobile device 105 while maintaining proper posture. Once again, display 115 therefore remains on. In FIG. 2B(b), the user has opened her mouth. Display 115 nevertheless remains on because the second time interval has not yet passed. Using a non-zero second time interval may be desirable, to help avoid turning off display 115 if, for example, the user is simply talking, rather than breathing through her mouth. Once the second time interval has passed and the user has not closed her mouth, mobile device 105 shuts off display 115, as illustrated in FIG. 2B(c).

Figure 3A:
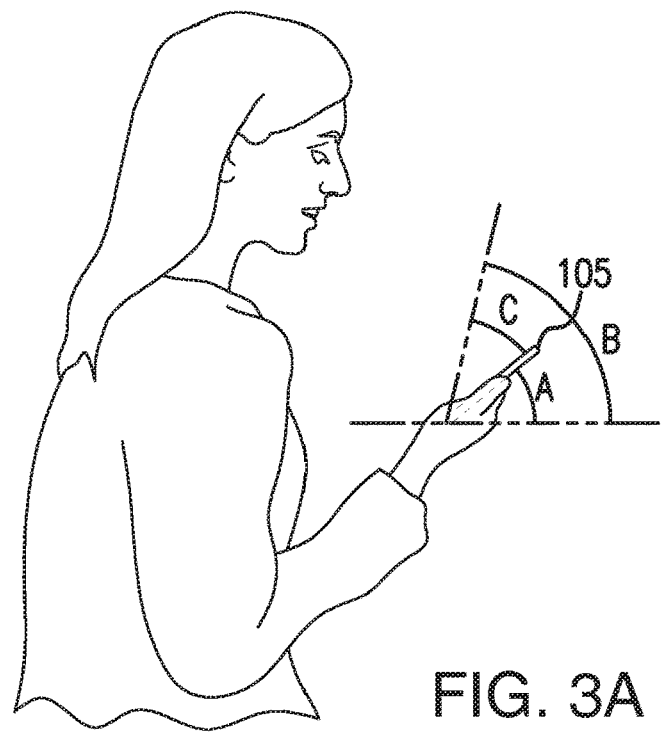
FIGS. 3A and 3B illustrate the orientation analyzer of the posture tool system in FIG. 1.
Figure 3B:
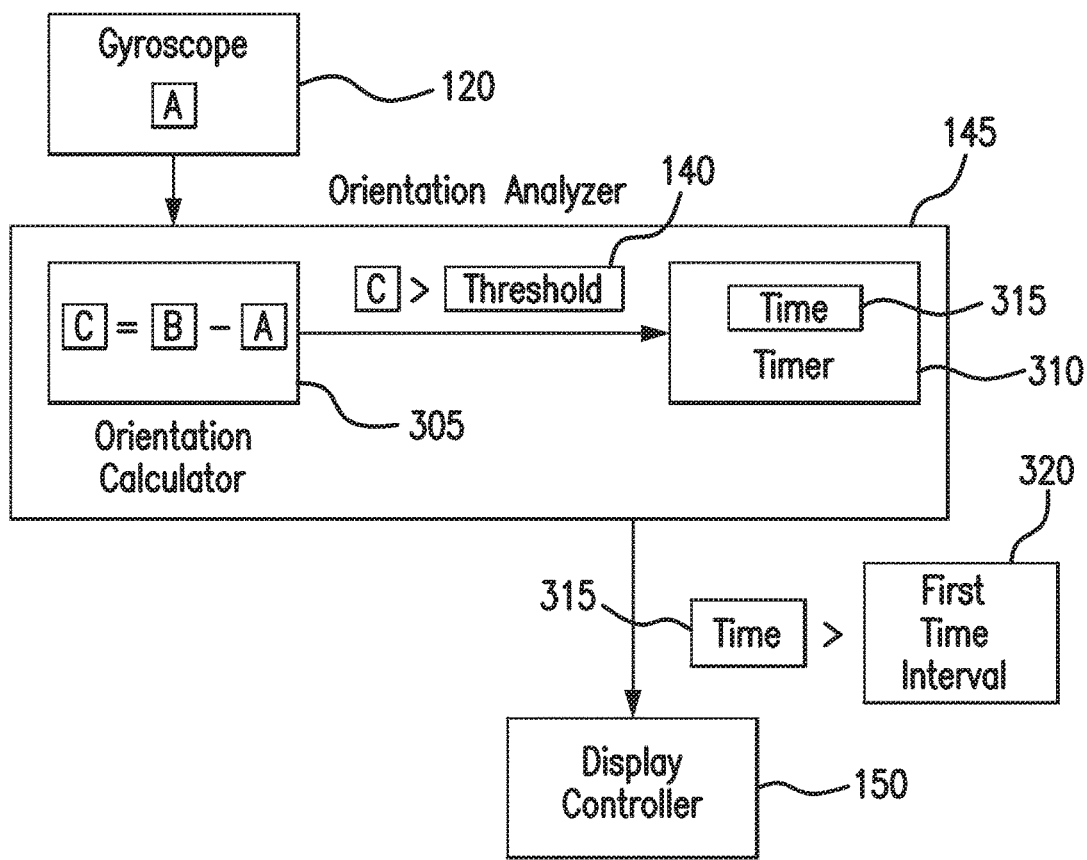

FIGS. 3A and 3B illustrate the operation of orientation analyzer 145 of posture tool system 100. FIG. 3A presents an illustration of the angles relevant to the analysis performed by orientation analyzer 145. Angle A represents the angle between display 115 of mobile device 105 and a plane that is substantially perpendicular to the direction of gravity. This disclosure contemplates that a plane is substantially perpendicular to the direction of gravity if it is within five degrees of being perpendicular to the direction of gravity. Angle A is measured by gyroscope 120 and provided to orientation analyzer 145. Angle B represents set angle 135. Set angle 135 is chosen to correspond to the angle between display 115 of mobile device 105 and a plane that is substantially perpendicular to the direction of gravity, that typically indicates that the user is operating mobile device 105 while maintaining proper posture.

In certain embodiments, set angle 135 is set at 90 degrees. This assumes that a user operating mobile device 105 with proper posture will hold mobile device 105 within threshold 140 of vertical. In further embodiments, set angle 135 is set based on the behavior of the particular user of mobile device 105. For example, in certain embodiments, in order to calibrate set angle 135, display 115 of mobile device 105 can communicate a prompt to the user requesting that the user operate mobile device 105 while maintaining proper posture. Mobile device 105 can then collect a series of measurements of the angle between the plane defined by the display and the plane that is substantially perpendicular to the direction of gravity, using gyroscope 120, and use these measurements to determine set angle 135. For example, mobile device 105 can determine set angle 135 based on the average of the series of measurements.

Angle C, depicted in FIG. 3A, represents the difference between set angle 135—depicted as angle B—and angle A, representing the angle between display 115 of mobile device 105 and a plane that is substantially perpendicular to the direction of gravity. The larger the value of angle C, the closer to horizontal the user is holding mobile device 105.

FIG. 3B illustrates the processes employed by orientation analyzer 145 in determining whether a user is operating mobile device 105 while maintaining proper posture. As can be seen, orientation analyzer receives angle A, representing the angle between display 115 of mobile device 105 and a plane that is substantially perpendicular to the direction of gravity, from gyroscope 120. Orientation calculator 305 then determines the difference (angle C) between set angle 135 (angle B) and angle A. Orientation analyzer 145 next determines whether this difference is greater than threshold 140. If orientation analyzer 145 determines that the difference is greater than threshold 140, orientation analyzer 145 starts timer 310, which stores the time 315 that has elapsed since timer 310 was first started. Orientation analyzer 145 continually receives updated values for angle A from gyroscope 120, from which it calculates updated values for the difference (angle C) between set angle 135 (angle B) and angle A. If, at any time 315 less than first time interval 320, orientation analyzer 145 determines that angle C is less than threshold 140, orientation analyzer 145 stops timer 310 and sets time 315 to zero. However, if time 315 reaches a value that is greater than first time interval 320, orientation analyzer 145 invokes display controller 150, which turns display 115 off.

In certain embodiments, threshold 140 is set based on the behavior of the particular user of mobile device 105. For example, in certain embodiments, in order to calibrate threshold 140, display 115 of mobile device 105 can communicate a prompt to the user requesting that the user operate mobile device 105 while maintaining proper posture. Mobile device 105 can then collect a series of measurements of the angle between the plane defined by the display and the plane that is substantially perpendicular to the direction of gravity, using gyroscope 120, and use these measurements to determine threshold 140. For example, mobile device 105 can determine threshold 140 based on the total range of angles included in the series of measurements. As another example, mobile device 105 can determine threshold 140 based on the standard deviation of the series of measurements.

An example algorithm for orientation analyzer 145 is as follows: set time 315 to zero; while time 315 is less than first time interval 320: {receive angle A, representing the angle between display 115 of mobile device 105 and a plane that is substantially perpendicular to the direction of gravity, from gyroscope 120; determine the difference (angle C) between set angle 135 (angle B) and angle A; determine whether this difference is greater than threshold 140; if the difference is greater than threshold 140, start timer 310, which updates time 315 based on the time that has elapsed since timer 310 was first started; if the difference is less than threshold 140, stop timer 310 and set time 315 to zero}; invoke display controller 150 to turn display 115 off.

Figure 4:
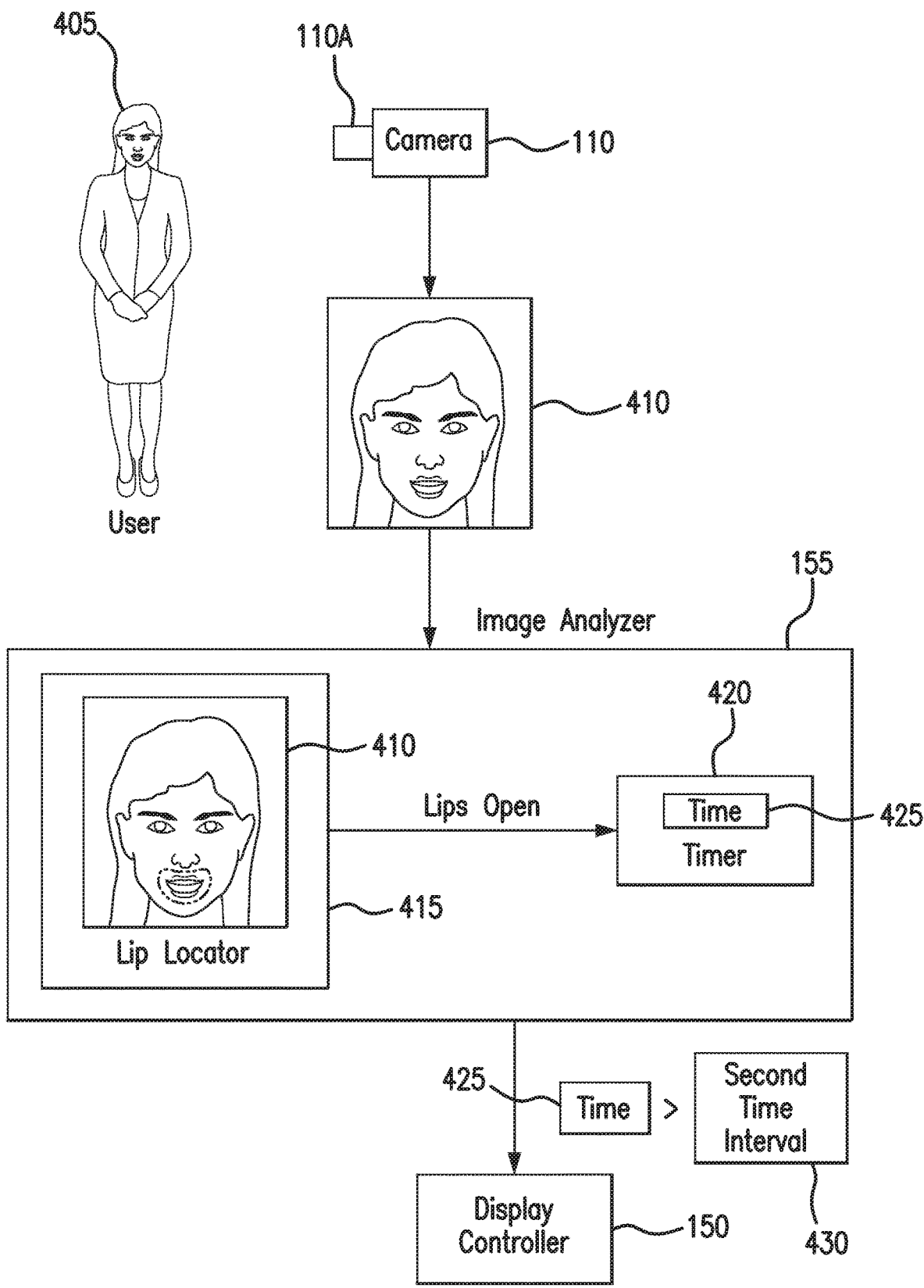
FIG. 4 illustrates the image analyzer of the posture tool system in FIG. 1.

FIG. 4 illustrates the processes employed by image analyzer 155 of posture tool system 100. Image analyzer 155 receives an image 410 of a user 405 captured by camera 110. Image analyzer 155 first uses lip locator 415 to determine the location of the user's lips in image 410. In certain embodiments, lip locator 415 uses a machine learning algorithm to determine the location of the user's lips in image 410. For example, a machine learning model can be trained to extract image pixels corresponding to the lips of user 405 from image 410. After determining the location of the user's lips in image 410, lip locator 415 next determines whether the user's lips are open. In certain embodiments, lip locator 415 determines that the user's lips are open by locating a region of pixels that do not correspond to the lips of user 405 that is surrounded by image pixels that do correspond to the lips of user 405.

If lip locator 415 determines that the user's lips are open, image analyzer 155 starts timer 420, which stores the time 425 that has elapsed since timer 420 was first started. Image analyzer 155 continually receives updated images 410 from camera 110. Image analyzer uses lip locator 415 to determine the location of the user's lips in these images 410, from which it determines whether the user's lips remain open. If, at any time time 425 is less than second time interval 430, image analyzer 155 determines that the user's lips are closed, image analyzer 155 stops timer 420 and sets time 425 to zero. However, if time 425 reaches a value that is greater than second time interval 430, image analyzer 155 invokes display controller 150 to turn off display 115.

An example algorithm for image analyzer 155 is as follows: set time 425 to zero; while time 425 is less than second time interval 430: {receive an image 410 of a user 405 from camera 110; use a machine learning algorithm to extract image pixels corresponding to the lips of user 405 from image 410; determine whether the user's lips are open, by searching for a region of pixels that does not correspond to the lips of user 405 that is surrounded by image pixels that do correspond to the lips of user 405; if the user's lips are open, start timer 420, which updates time 425 based on the time that has elapsed since timer 420 was first started; if the user's lips are not open, stop timer 420 and set time 425 to zero}; invoke display controller 150 to turn display 115 off.

Figure 5B:
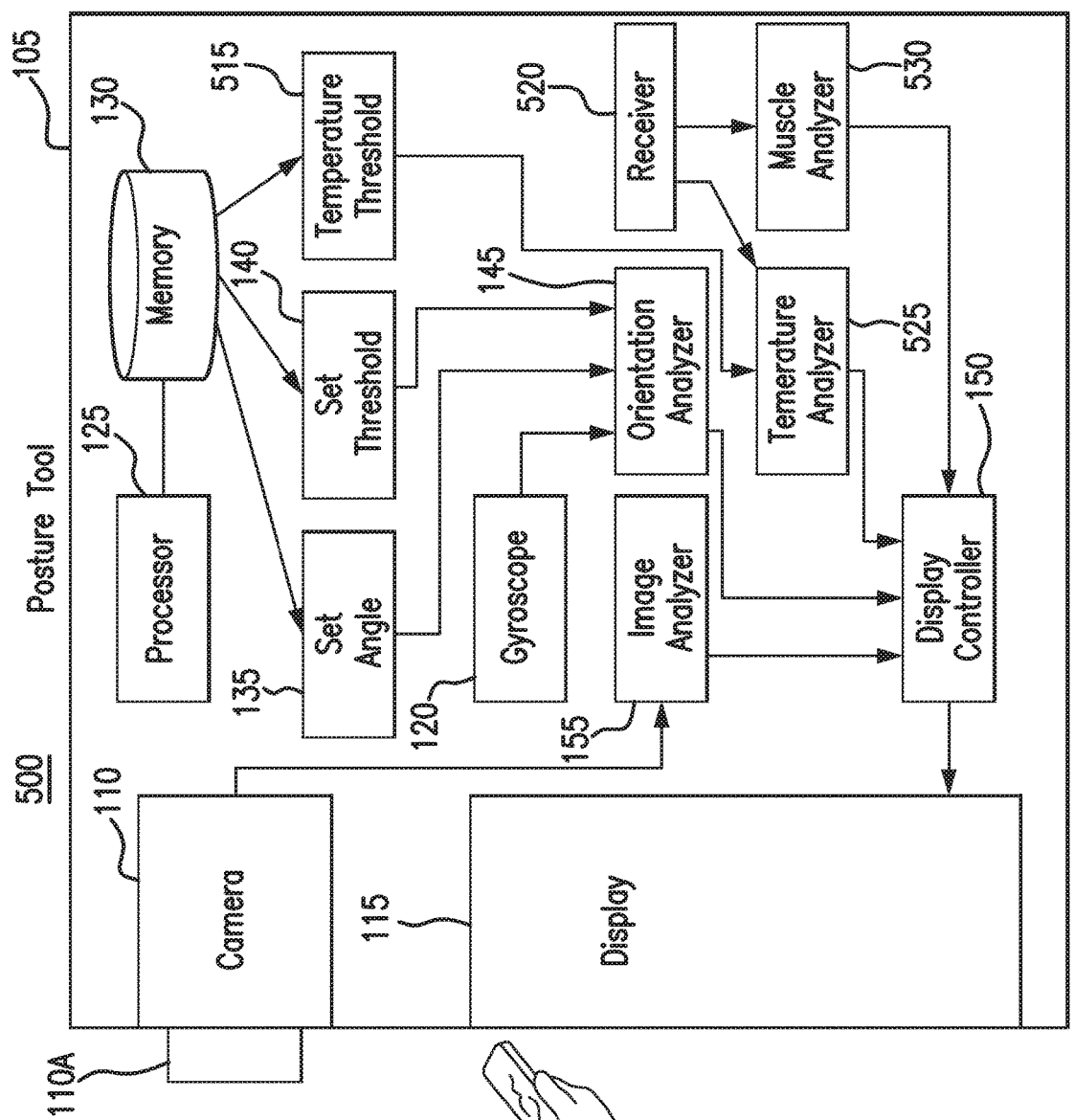
FIGS. 5A and 5B illustrate an example posture tool system that includes sensors attached to a user of the posture tool.
Figure 5A:
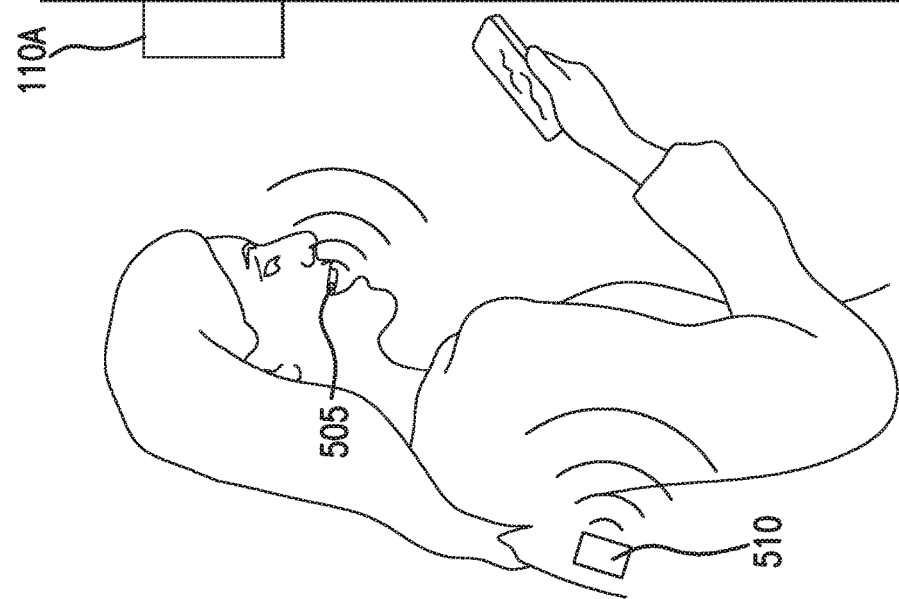

In certain embodiments, in addition to image analyzer 155 and orientation analyzer 145, posture tool system 100 can implement further analyzers, to help determine whether a user of mobile device 105 is maintaining proper posture and/or breathing through his/her nose while operating mobile device 105. FIGS. 5A and 5B present an example embodiment of posture tool system 100 that includes two such additional analyzers—temperature analyzer 525 and muscle analyzer 530. For simplicity, this example embodiment of posture tool system 100 is labelled as posture tool system 500. This disclosure contemplates that posture tool system 500 can include only temperature analyzer 525 in addition to image analyzer 155 and orientation analyzer 145, only muscle analyzer 530 in addition to image analyzer 155 and orientation analyzer 145, or both temperature analyzer 525 and muscle analyzer 530 in addition to image analyzer 155 and orientation analyzer 145.

In certain embodiments of posture tool system 500 that include temperature analyzer 525, posture tool system 500 can include intraoral sensor 505, used to monitor the temperature of a user's mouth. Intraoral sensor 505 can be attached to an oral appliance, affixed to one of a user's teeth, or placed in a user's mouth in any other appropriate manner. Intraoral sensor 505 can be used to communicate the temperature of the user's mouth to receiver 520 for use by temperature analyzer 525 of posture tool system 500. Temperature analyzer 525 of posture tool system 100 can then determine that the temperature of the user's mouth remains below a certain threshold for a fourth time interval, indicating that the user's mouth is likely open. Temperature analyzer 525 can then communicate this information to display controller 150, which will then turn display 115 off.

An example algorithm for temperature analyzer 525 is as follows: set time to zero; while time is less than a fourth time interval: {receive the temperature of the user's mouth from receiver 520; determine whether the temperature of the user's mouth is below a threshold; if the temperature of the user's mouth is below the threshold, start a timer to update the time; if the temperature of the user's mouth is above the threshold, stop the timer and set the time to zero}; invoke display controller 150 to turn display 115 off.

In certain embodiments of posture tool system 500 that include muscle analyzer 530, posture tool system 500 can include one or more surface electromyography (sEMG) devices 510, placed on a user of mobile device 105, that are used to provide bio-feedback information to receiver 520 of mobile device 105 about muscle firing in the user's neck and/or back. Muscle analyzer 530 of posture tool system 500 can then analyze the bio-feedback information to determine whether or not it corresponds to proper posture. If muscle analyzer 530 of posture tool system 500 determines that the bio-feedback information corresponds to improper posture, it can then communicate this information to display controller 150, which will then turn display 115 off.

An example algorithm for muscle analyzer 530 is as follows: receive bio-feedback information about muscle firing in the user's neck and/or back from receiver 520; compare this bio-feedback information to stored muscle firing data corresponding to proper posture and stored muscle firing data corresponding to improper posture; determine, based on the comparison, that the muscle firing data corresponds to improper posture; invoke display controller 150 to turn display 115 off.

This disclosure contemplates that intraoral sensor 505 and/or sEMGs 510 can be any type of electronic device, equipped with an antenna, and capable of transmitting information to mobile device 105. In certain embodiments, intraoral sensor 505 and/or sEMGs 510 contain a radio-frequency identification (RFID) transmitter. In further embodiments, intraoral sensor 505 and/or sEMGs 510 include a Bluetooth transmitter. In certain embodiments, intraoral sensor 505 and/or sEMGs 510 contain a passive transmitter, powered by electromagnetic waves generated by mobile device 105. In further embodiments, intraoral sensor 505 and/or sEMGs 510 contain an active transmitter, powered by a power source within or coupled to intraoral sensor 505 and/or sEMGs 510, such that intraoral sensor 505 and/or sEMGs 510 can transmit the information automatically.

Figure 6:
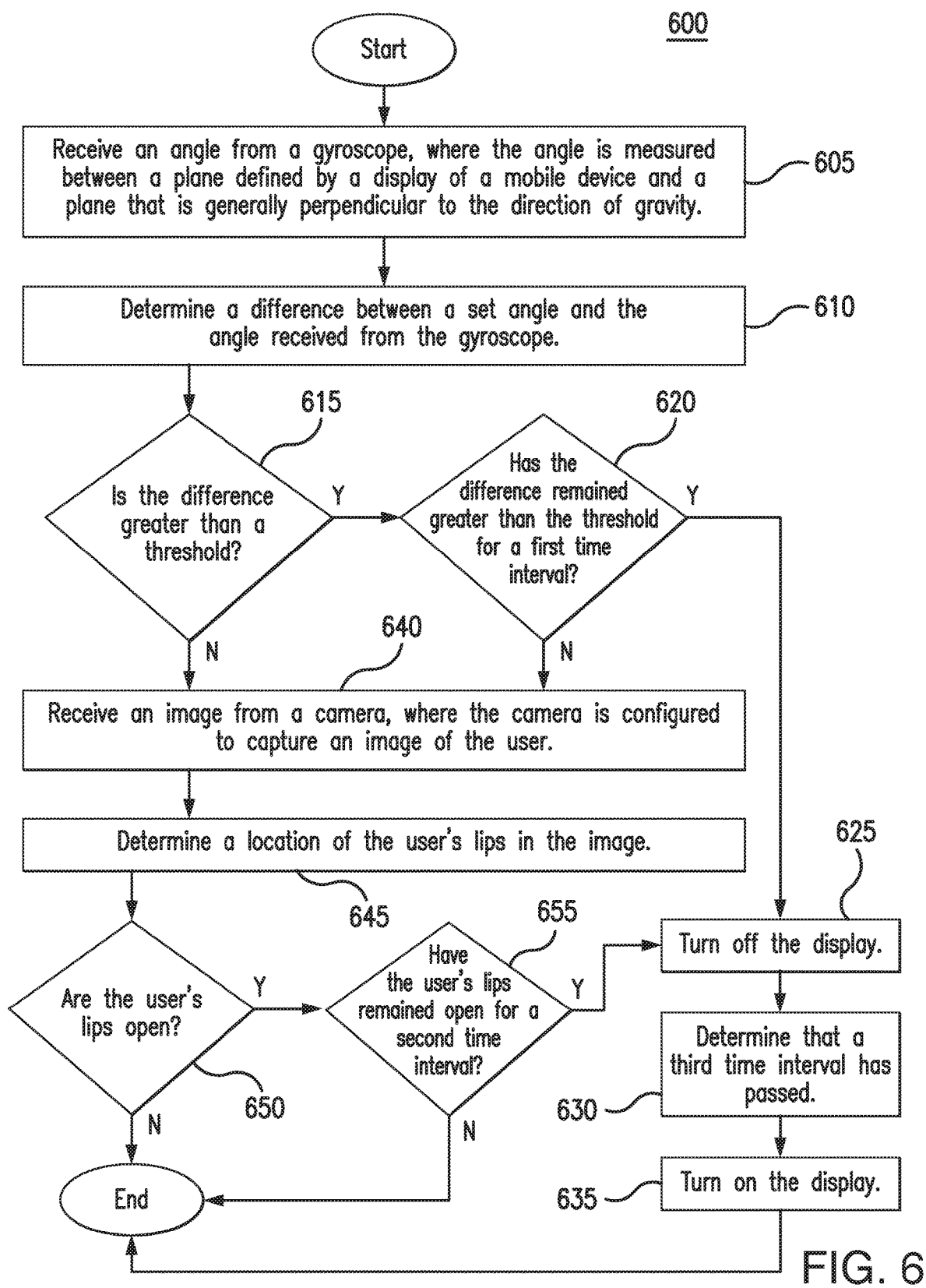
FIG. 6 presents a flowchart illustrating the process by which the mobile device in the posture tool system of FIG. 1 determines that a user is either breathing though his/her mouth or not maintaining proper posture or breather through his/her mouth while operating the device and therefore shuts off the display.

FIG. 6 further illustrates the process by which mobile device 105 of posture tool system 100 determines that a user is either not maintaining proper posture or breathing through his/her mouth while operating mobile device 105 and therefore shuts off display 115. In step 605, orientation analyzer 145 receives an angle from gyroscope 120, where the angle is measured between a plane defined by display 115 of mobile device 105 and a plane that is substantially perpendicular to the direction of gravity. This disclosure contemplates that a plane is substantially perpendicular to the direction of gravity if it is within five degrees of being perpendicular to the direction of gravity. Next, in step 610, orientation analyzer 145 determines a difference between set angle 135 and the angle received from gyroscope 120.

In certain embodiments, set angle 135 is set at 90 degrees. This assumes that a user operating mobile device 105 with proper posture will hold mobile device 105 within threshold 140 of vertical. In further embodiments, set angle 135 is set based on the behavior of the particular user of mobile device 105. For example, in certain embodiments, in order to calibrate set angle 135, display 115 of mobile device 105 can communicate a prompt to the user requesting that the user operate mobile device 105 while maintaining proper posture. Mobile device 105 can then collect a series of measurements of the angle between the plane defined by the display and the plane that is substantially perpendicular to the direction of gravity, using gyroscope 120, and use these measurements to determine set angle 135. For example, mobile device 105 can determine set angle 135 based on the average of the series of measurements.

In step 615, orientation analyzer 145 determines whether the difference is greater than threshold 140. In certain embodiments, threshold 140 is set based on the behavior of the particular user of mobile device 105. For example, in certain embodiments, in order to calibrate threshold 140, display 115 of mobile device 105 can communicate a prompt to the user requesting that the user operate mobile device 105 while maintaining proper posture. Mobile device 105 can then collect a series of measurements of the angle between the plane defined by the display and the plane that is substantially perpendicular to the direction of gravity using gyroscope 120 and use these measurements to determine threshold 140. For example, mobile device 105 can determine threshold 140 based on the total range of angles included in the series of measurements. As another example, mobile device 105 can determine threshold 140 based on the standard deviation of the series of measurements.

If orientation analyzer 145 determines that the difference is greater than threshold 140, orientation analyzer 145 next determines whether the difference remains greater than threshold 140 for a first time interval, in step 620. If orientation analyzer 145 determines that the difference does remain greater than threshold 140 for the first time interval, orientation analyzer 145 next invokes display controller 150, which turns off display 115, in step 625. In step 630, display controller 630 next determines that a third time interval has passed, and in step 635, display controller turns display 115 back on.

In certain embodiments, the third time interval over which display controller 150 waits before turning display 115 back on is a constant value, set by a user of mobile device 105. For example, a parent may set the value for the third time interval on a mobile device 105 used by his/her child, based on the parent's preferences. In further embodiments, the third time interval is variable. As an example, in certain embodiments display controller 150 can additionally update a counter each time display controller 150 turns display 115 off. Display controller 150 can then use the value of the counter to determine the frequency with which display controller 150 turns display 115 off, thereby indicating the frequency with which a user of mobile device 105 exhibits poor posture while using mobile device 105. Display controller 150 can then modify the third time interval based on the frequency, increasing its value when the frequency with which display controller 150 turns off display 115 increases. This is desirable as individual behaviors will likely vary, and a high frequency value presumably indicates that the third time interval is not long enough for the action of turning off display 115 to act as a deterrent for the particular user. Additionally, display controller 150 can decrease the value of the third time interval when the frequency with which display controller 150 turns off display 115 decreases. This can be desirable, because a low frequency likely indicates that the user is, in general, maintaining proper posture during his/her usage of mobile device 105, and therefore may only need an occasional, quick reminder when he/she has a lapse in his/her proper posture maintenance.

In certain embodiments, after determining that the difference between set angle 135 and the angle measured by gyroscope 120 remains greater than threshold 140 for the first time interval, mobile device 105 communicates a message to the user, indicating that the user was not maintaining proper posture. For example, in certain embodiments, display controller 150 causes a message to be displayed on display 115 prior to turning display 115 off. In other embodiments, display controller 150 causes a message to be displayed on display 115 after turning display 115 back on. In further embodiments, mobile device 105 outputs an audio message to the user while display 115 is off. Communicating a message to the user is desirable to ensure that the user is aware of the reason that display 115 shut off and doesn't think that there is something wrong with his/her mobile device 105.

If orientation analyzer 145 determines that the difference between set angle 135 and the angle measured by gyroscope 120 is not greater than threshold 140, in step 615, image analyzer 155 next receives an image 410 from camera 110, in step 640. Camera 110 is configured to capture an image of a user of mobile device 105. Next, in step 645, image analyzer 155 determines a location of the user's lips in image 410. In certain embodiments, image analyzer 155 uses a machine learning algorithm to determine the location of the user's lips in image 410. For example, a machine learning model may be trained to extract image pixels corresponding to the user's lips from image 410.

After determining the location of the user's lips in image 410, image analyzer 155 next determines whether the user's lips are open, in step 650. In certain embodiments, image analyzer 155 determines that the user's lips are open by locating a region of pixels that do not correspond to the lips of the user that is surrounded by image pixels that do correspond to the lips of the user.

If image analyzer 155 determines that the user's lips are open, image analyzer 155 next determines whether the user's lips remain open for a second time interval, in step 655. If, in step 655, image analyzer 155 determines that the user's lips have remained open for the second time interval, image analyzer 155 next invokes display controller 150, which turns off display 115 in step 625. In step 630, display controller 150 next determines that a third time interval has passed, and in step 635, display controller turns display 115 back on.

As discussed above, in certain embodiments, the third time interval over which display controller 150 waits before turning display 115 back on is a constant value, set by a user of mobile device 105. For example, a parent may set the value for the third time interval on a mobile device 105 used by his/her child, based on the parent's preferences. In further embodiments, the third time interval is variable. As an example, in certain embodiments display controller 150 can additionally update a counter each time display controller 150 turns display 115 off. Display controller 150 can then use the value of the counter to determine the frequency with which display controller 150 turns display 115 off, thereby indicating the frequency with which a user of mobile device 105 exhibits poor posture while using mobile device 105. Display controller 150 can then modify the third time interval based on the frequency, increasing its value when the frequency with which display controller 150 turns off display 115 increases. This is desirable as individual behaviors will likely vary, and a high frequency value presumably indicates that the third time interval is not long enough for the action of turning off display 115 to act as a deterrent for the particular user. Additionally, display controller 150 can decrease the value of the third time interval when the frequency with which display controller 150 turns off display 115 decreases. This is desirable because a low frequency likely indicates that the user is, in general, breather through his/her mouth during his/her usage of mobile device 105, and therefore may only need an occasional, quick reminder when he/she has a lapse in his/her nasal breathing.

In certain embodiments, after determining that the user's lips remain open for a time greater than the second time interval, mobile device 105 communicates a message to the user, indicating that the user was engaged in mouth breathing. For example, in certain embodiments, display controller 150 causes a message to be displayed on display 115 prior to turning display 115 off. In other embodiments, display controller 150 causes a message to be displayed on display 115 after turning display 115 back on. In further embodiments, mobile device 105 outputs an audio message to the user while display 115 is off. Communicating a message to the user is desirable to ensure that the user is aware of the reason that display 115 shut off and doesn't think that there is something wrong with his/her mobile device 105.

Modifications, additions, or omissions can be made to method 500 depicted in FIG. 5. Method 500 can include more, fewer, or other steps. For example, steps can be performed in parallel or in any suitable order. While discussed as posture tool system 100 (or components thereof) performing the steps, any suitable component of posture tool system 100 can perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of the appended claims.

What is claimed is:

1. A mobile device comprising:
a display;
a gyroscope configured to determine an angle between a plane defined by the display and a plane that is substantially perpendicular to the direction of gravity;
a camera positioned on a surface of the mobile device, the surface comprising the display, the camera configured to capture an image of a user;
a memory configured to store a set angle and a threshold;
a hardware processor communicatively coupled to the memory, the hardware processor configured to:
receive the angle from the gyroscope;
determine a difference between the set angle and the angle;
determine that the difference remains greater than the threshold for a first time interval;
receive the image from the camera;
determine a location of the user's lips in the image;
determine, based on the location of the user's lips, that the user's lips are open;
determine that the user's lips remain open for a second time interval;
in response to determining that the difference remains greater than the threshold for the first time interval or that the user's lips remain open for the second time interval, turn off the display; and
in response to turning off the display:
determine that a third time interval has passed; and
in response to determining that the third time interval has passed, turn on the display.

2. The mobile device of claim 1, wherein the set angle is ninety degrees.

3. The mobile device of claim 1, wherein:
the display is further configured to communicate a prompt to the user requesting that the user operate the mobile device while maintaining proper posture; and
the processor is further configured to:
collect a series of measurements of the angle between the plane defined by the display and the plane that is substantially perpendicular to the direction of gravity; and
determine the set angle based on the series of measurements.

4. The mobile device of claim 1, wherein:
the display is further configured to communicate a prompt to the user requesting that the user operate the mobile device while maintaining proper posture; and
the processor is further configured to:
collect a series of measurements of the angle between the plane defined by the display and the plane that is substantially perpendicular to the direction of gravity; and
determine the threshold based on the series of measurements.

5. The mobile device of claim 1, wherein the third time interval is set by the user.

6. The mobile device of claim 1, wherein the processor is further configured to:
in response to turning off the display, update a counter;
determine a frequency, based on the counter; and
adjust the third time interval, based on the frequency.

7. The mobile device of claim 1, wherein in response to turning off the display, the device is further configured to communicate a message to the user indicating that the user was mouth breathing and/or not maintaining proper posture.

8. A method comprising:
receiving an angle from a gyroscope, the gyroscope configured to determine the angle between a plane defined by a display of a mobile device and a plane that is substantially perpendicular to the direction of gravity;
determining a difference between a set angle and the angle;
receiving an image from a camera, the camera positioned on a surface of the mobile device, the surface comprising the display, the camera configured to capture an image of a user;
determining a location of the user's lips in the image;
determining, based on the location of the user's lips, that the user's lips are open;
determining either that the difference remains greater than a threshold for a first time interval or that the user's lips remain open for a second time interval;
in response to determining either that the difference remains greater than the threshold for the first time interval or that the user's lips remain open for a second time interval, turning off the display;
in response to turning off the display:
determining that a third time interval has passed; and
in response to determining that the third time interval has passed, turning on the display.

9. The method of claim 8, wherein the set angle is ninety degrees.

10. The method of claim 8, further comprising:
communicating a prompt to the user, using the display, requesting that the user operate the mobile device while maintaining proper posture;
collecting a series of measurements of the angle between the plane defined by the display and the plane that is substantially perpendicular to the direction of gravity; and
determining the set angle based on the series of measurements.

11. The method of claim 8, further comprising:
communicating a prompt to the user, using the display, requesting that the user operate the mobile device while maintaining proper posture;
collecting a series of measurements of the angle between the plane defined by the display and the plane that is substantially perpendicular to the direction of gravity; and
determining the threshold based on the series of measurements.

12. The method claim 8, wherein the third time interval is set by the user.

13. The method of claim 8, further comprising:
in response to turning off the display, updating a counter;
determining a frequency, based on the counter; and
adjusting the third time interval, based on the frequency.

14. The method claim 8, further comprising, in response to turning off the display, communicating a message to the user indicating that the user was mouth breathing and/or not maintaining proper posture.

15. A system comprising:
a display;
a gyroscope configured to determine an angle between a plane defined by the display and a plane that is substantially perpendicular to the direction of gravity;
a camera positioned on a surface of a mobile device, the surface comprising the display, the camera operable to capture an image of a user;
a storage element operable to store a set angle and a threshold;
a processing element communicatively coupled to the storage element, the processing element configured to:
receive the angle from the gyroscope;
determine a difference between the set angle and the angle;
determine that the difference remains greater than the threshold for a first time interval;
receive the image from the camera;
determine a location of the user's lips in the image;
determine, based on the location of the user's lips, that the user's lips are open;
determine that the user's lips remain open for a second time interval;
in response to determining that the difference remains greater than the threshold for the first time interval or that the user's lips remain open for the second time interval, turn off the display; and
in response to turning off the display:
determine that a third time interval has passed;
in response to determining that the third time interval has passed, turn on the display; and
communicate a message to the user indicating that the user was mouth breathing and/or not maintaining proper posture.

16. The system of claim 15, wherein the set angle is ninety degrees.

17. The system of claim 15, wherein:
the display is further configured to communicate a prompt to the user requesting that the user operate the mobile device while maintaining proper posture; and
the processing element is further configured to:
collect a series of measurements of the angle between the plane defined by the display and the plane that is substantially perpendicular to the direction of gravity; and
determine the set angle based on the series of measurements.

18. The system of claim 15, wherein:
the display is further configured to communicate a prompt to the user requesting that the user operate the mobile device while maintaining proper posture; and
the processing element is further configured to:
collect a series of measurements of the angle between the plane defined by the display and the plane that is substantially perpendicular to the direction of gravity; and
determine the threshold based on the series of measurements.

19. The system of claim 15, wherein the third time interval is set by the user.

20. The system of claim 15, wherein the processing element is further configured to:
in response to turning off the display, update a counter;
determine a frequency, based on the counter; and
change the third time interval, based on the frequency.

\* \* \* \* \*